(12) United States Patent
Bertz

(10) Patent No.: US 8,214,518 B1
(45) Date of Patent: Jul. 3, 2012

(54) DYNAMIC MULTIMEDIA PRESENTATIONS

(75) Inventor: Lyle T. Bertz, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 715 days.

(21) Appl. No.: 12/135,716

(22) Filed: Jun. 9, 2008

(51) Int. Cl.
*G06F 15/16* (2006.01)

(52) U.S. Cl. ........................... 709/231; 709/219

(58) Field of Classification Search ............ 709/231, 709/219
See application file for complete search history.

(56) References Cited

U.S. PATENT DOCUMENTS

| | | | |
|---|---|---|---|
| 5,933,811 A | | 8/1999 | Angles |
| 6,012,098 A | * | 1/2000 | Bayeh et al. ............... 709/246 |
| 6,169,542 B1 | | 1/2001 | Hooks |
| 6,505,169 B1 | | 1/2003 | Bhagavath |
| 7,359,871 B1 | * | 4/2008 | Paasche et al. ............ 705/26 |
| 7,418,504 B2 | * | 8/2008 | Larson et al. ............. 709/226 |
| 7,680,819 B1 | * | 3/2010 | Mellmer et al. ........... 707/783 |
| 7,756,526 B2 | * | 7/2010 | Silverbrook et al. ...... 455/456.1 |
| 7,761,114 B2 | * | 7/2010 | Silverbrook et al. ...... 455/556.1 |
| 7,778,884 B2 | * | 8/2010 | Bamborough et al. ..... 705/26 |
| 2003/0033517 A1 | * | 2/2003 | Rutherglen et al. ....... 713/153 |
| 2003/0135633 A1 | * | 7/2003 | Dror et al. ................ 709/231 |
| 2003/0158777 A1 | | 8/2003 | Schiff |
| 2004/0019900 A1 | | 1/2004 | Knightbridge |
| 2005/0038826 A1 | * | 2/2005 | Bae et al. ................. 707/200 |
| 2007/0112680 A1 | * | 5/2007 | van Niekerk et al. ...... 705/57 |
| 2007/0130499 A1 | * | 6/2007 | Kim ........................ 715/500.1 |
| 2008/0005264 A1 | * | 1/2008 | Brunell et al. ........... 709/217 |
| 2008/0090513 A1 | * | 4/2008 | Collins et al. ............. 455/3.01 |
| 2008/0276266 A1 | | 11/2008 | Huchital |

FOREIGN PATENT DOCUMENTS

WO    WO2006/114413 A1 * 11/2006

OTHER PUBLICATIONS

SMIL Channel Generator, TableauMedia.com, Market Wire, Oct. 2000, http://findarticles.com/p/articles/mi_pwwi/is_200010/ai_mark01018834/print.
Media Modeler Suite of Content Management and Authoring Software, TableauMedia.com.
All You Have to do is . . . SMIL, WebProNews.com http://archive.webpronews.com/archives/011501.html.
Kate Kaye, The ClickZ Network, "Video Ad Firm Adap.tv Launches to Serve Direct Response Advertisers," Webpage, May 14, 2007, 2 pp. IT address: http://www.clickz.com/3625848.

* cited by examiner

*Primary Examiner* — Krista Zele
*Assistant Examiner* — Tariq Najee-Ullah

(57) ABSTRACT

A method, system, and medium are provided for using a synchronized and distributed SMIL document to provide a dynamic multimedia presentation while maintaining client anonymity. An embodiment of the invention includes receiving a client request for a multimedia presentation. Client-specific information is removed from the client request and a SMIL document is generated for facilitating provision of the multimedia presentation. The SMIL document is synchronized across a plurality of network elements, and is configured to provide an interactive experience to a user.

20 Claims, 10 Drawing Sheets

DYNAMIC MULTIMEDIA PRESENTATIONS

SUMMARY

The present invention is defined by the claims below, not this summary. We offer a high-level overview of embodiments of the invention here to provide an overview of the disclosure.

In a first illustrative aspect, a method of providing a dynamic multimedia presentation while maintaining client anonymity is provided. Access is provided to a multimedia presentation. A request is received from a client for the presentation. The client-specific information is removed from the request. The dynamic multimedia presentation is generated by creating a Synchronized Multimedia Integration Language (SMIL) document. A copy of the SMIL document is created. A stripped document is created by removing executable elements not executable by the client. The stripped document is communicated to the client.

In a second illustrative aspect, a system for providing a synchronized multimedia presentation with inter-stitial targeted companion media by using a distributed dynamically updateable SMIL document is provided. One embodiment of that system includes a rich media service gateway (RMSG) for anonymizing communications between a client and various entities within a content delivery network (CDN). The exemplary embodiment further includes a media referral gateway (MRG) for creating a SMIL document and a media content server for providing multimedia content to the client in response to a second client request for content.

In a third illustrative aspect, a method for providing a dynamic multimedia presentation while maintaining client anonymity is provided. A multimedia presentation is provided to a client. Client input is received and data that identifies the client is removed from the client input to create an anonymous input. Targeting information corresponding to the anonymous information is communicated to a second network. A presentation update is received based on the communicated information. The presentation update is provided to the client.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1A:
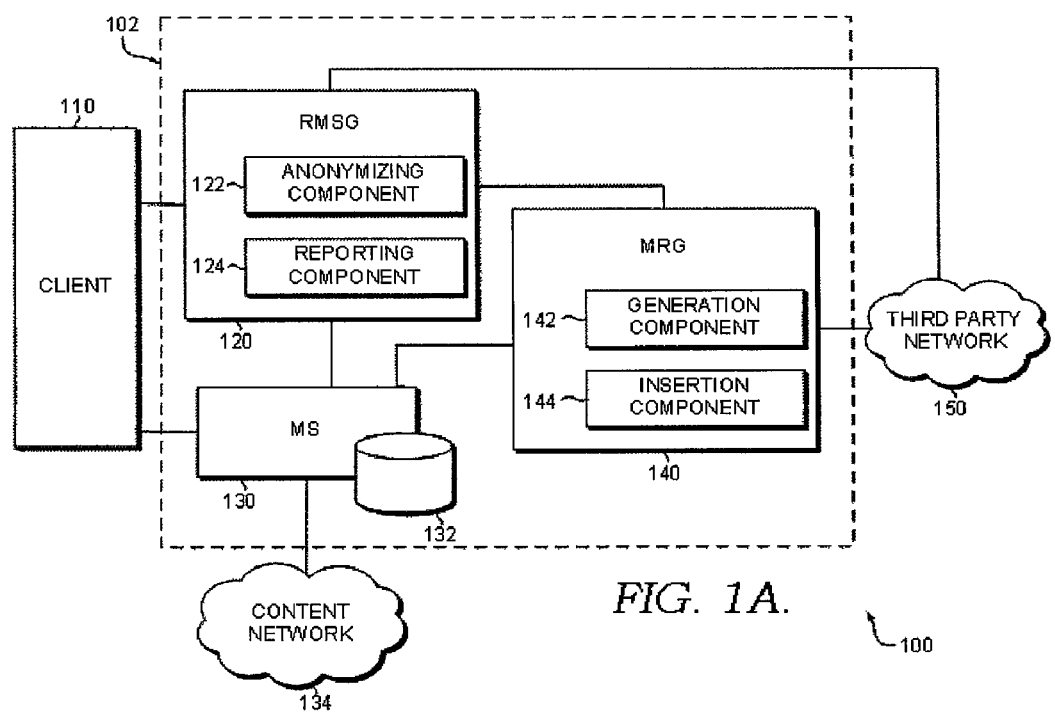
FIG. 1A is a block diagram illustrating an exemplary networking environment suitable for implementing embodiments of the present invention.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CDN | Content Delivery Network |
| CD-ROM | Compact Disc Read-Only Memory |
| DVD | Digital Versatile Disc |
| EEPROM | Electrically Erasable Programmable Read-Only Memory |
| MRG | Media Referral Gateway |
| MS | Media Server |
| NAT | Network Address Translation |
| PDA | Personal Digital Assistant |
| RAM | Random Access Memory |
| RMSG | Rich Media Service Gateway |
| RTP | Real Time Protocol |
| ROM | Read-Only Memory |
| SMIL | Synchronized Multimedia Integration Language |
| URI | Uniform Resource Identifier |
| URL | Uniform Resource Locator |

Further, various technical terms are used throughout this description. An illustrative resource that fleshes out various aspects of these terms can be found in *Newton's Telecom Dictionary* by H. Newton, 23rd Edition (2007).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a server, a gateway, and various other network devices. Computer-readable media may include computer-readable storage media. By way of example, and not limitation, computer-readable storage media may comprise media implemented in any method or technology for storing information. Examples of stored information include computer-useable instructions, data structures, program modules or components, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Turning now to FIG. 1, an exemplary networking environment 100 suitable for implementing various embodiments of the present invention is shown. Networking environment 100 includes a client 110, a content delivery network (CDN) 102, which includes a rich media service gateway (RMSG) 120, a media server (MS) 130, and a media referral gateway (MRG) 150, a third party network 150 and a content network 134. Networking environment 100 is merely an example of one suitable networking environment and is not intended to suggest any limitation as to the scope of use or functionality of the present invention. Neither should networking environment 100 be interpreted as having any dependency or requirement related to any single component or combination of components illustrated therein.

CDN 102 may be part of a larger network such as, for example, a mobile communications network, a wide area network (WAN), an internet service network (e.g., a network for providing service to the internet operated by an internet service provider (ISP)), or any other network that is capable of being insulated to some degree from the internet.

The various elements of CDN 102 such as, for example, the elements illustrated in FIG. 1, may be implemented on a computing device, and may be implemented in a number of different configurations. In one embodiment, each of RMSG 120, MS 130, and MRG 140 is implemented on a dedicated server residing on a computing device. In some embodiments, RMSG 120, MS 130, and MRG 140 are each implemented on a separate server. In other embodiments, one or more of RMSG 120, MS 130, and MRG 140 are implemented on a common server, and in further embodiments, all of these elements are implemented on a single server. In various embodiments, where RMSG 120, MS 130, and MRG 140 are located on the same server, each of these elements operate as a separate application or process on the server. In other embodiments, the functionality of one or more of the elements can be combined into a single application or process.

Furthermore, it will be readily appreciated that content network 134 and third party network 150 can each comprise various types of networks remote from CDN 102. In an embodiment, each of content network 134 and third party network 150 is a CDN. In another embodiment, content network 134 is, is included in, or includes a third party network 150. In various embodiments, one or both of content network 134 and third party network 150 can include any number of servers, clients, gateways and other network elements. In an embodiment, third party network 150 includes one or more ad servers, which contain advertising content that can be delivered to client 110 through CDN 102. In other embodiments, third party network 150 includes one or more content servers, which contain content that can be delivered to client 110 through CDN 102.

As used herein, the term content refers to any type of content that can be experienced using a computing device or communications device such as, for example, multimedia content (e.g., audio, video, and the like), text, images, applications, links, objects, interactive objects, buttons, scrolling tools, reference items, and the like. It should be understood that the descriptions made herein with reference to third party network 150 may apply equally to content network 134. The two networks are drawn and labeled separately herein to facilitate a clearer understanding of various embodiments of the present invention.

It will be understood by those skilled in the art that each of these elements of the networking environment 100 is also scalable. That is, for example, RMSG 120 can actually include a plurality of RMSGs, operating in parallel with a load balancer such that large amounts of traffic may be managed. Of course, the same is true with any of the other elements of the exemplary networking environment 100 such as, for example, MRG 140, MS 130, and any other network element or server that may be employed in an embodiment of the present invention. Any or all of these servers may be implemented using any number of server modules, devices, machines, and the like.

Client 110 resides on a computing device such as, for example, a computer or other machine, such as a personal data assistant (PDA) or other handheld device. The invention can be practiced in a variety of system configurations, including hand-held devices, consumer electronics, general-purpose computers, laptops, tablets, mobile communications devices, PDA's, and the like. The invention can also be practiced in distributed computing environments where tasks are performed by remote-processing devices that are linked through a communications network.

Client 110, as illustrated in FIG. 1, communicates with RMSG 120 and MS 130. In an embodiment, client 110 includes software and hardware components that are configured for executing multimedia presentation documents provided to client 110 by the various servers of the network 100. In one embodiment, these components include the ability to execute SMIL documents and to render one or more types of multimedia content such as audio and video content. A user can use client 110 to experience multimedia content, which the user obtains by causing client 110 to request a multimedia presentation from CDN 102. In an embodiment, a request for a multimedia presentation is sent from client 110 to, for example, RMSG 120, which requests a corresponding SMIL document from MRG 140.

RMSG 120 provides anonymization services, reporting services, and an interface between CDN 102 and client 110. In an embodiment, RMSG 120 receives requests for multimedia presentations from client 110. These requests are anonymized at RMSG 120 and forwarded to MRG 140. In various embodiments, responses to forwarded requests include, for example, a SMIL document which is communicated from MRG 140 to RMSG 120. In some embodiments, RMSG 120 performs various operations to the SMIL document before providing it to client 110. For example, in one embodiment, RMSG 120 strips various elements out of the SMIL document such that only elements which client 110 must execute remain. This procedure facilitates the provisioning of a smaller document to client 110, and can also facilitate a more efficient execution of the document at client 110. In an embodiment, RMSG 120 also provides anonymization services with regard to communications from various elements of CDN 102 to client 110 or to other entities such as entities associated with third party network 150 or content network 134.

RMSG 120 comprises an anonymizing component 122 and a reporting component 124. Anonymizing component 122 facilitates the protection of client and user identity by preventing data or information specific to client 110 from being communicated to entities outside of CDN 102. In one embodiment, when a request is communicated from client 110 to any other entity, the request is processed at RMSG 120, which removes any client-specific information that may be used to identify client 110 or otherwise cause a breach of security with respect to client 110. This process can be performed on any type of request or other communication originating at client 110.

Anonymizing component 122 also facilitates the protection of various elements within CDN 102 such as, for example, MRG 140 and MS 130. In one embodiment, client 110 is treated as a semi-trusted entity, and accordingly, it may be desirable to prevent various types of identifying information or data from being communicated to client 110. Similarly, in various embodiments, regardless of the level of trust given client 110, it may be desirable to protect various attributes and identifying information associated with elements of CDN 102 from entities that are remote from CDN 102 such as, for example, entities that are associated with third party network 150 or content network 134. Anonymizing component 122 provides such functionality by removing information or data that can be used to compromise the security of CDN 102 or any element thereof.

RMSG 120 also includes a reporting component 124. Reporting component 124 facilitates the reporting of events to various entities within the networking environment 100. In one embodiment, reporting component 124 reports inputs received from or actions taken by client 110. For example, according to an embodiment, such inputs include clicks made by a user associated with client 110, requests communicated from client 110, commands issued by client 110, and the like.

Reporting component 124 also reports events associated with execution of a SMIL document. In an embodiment, reporting component 124 reports execution of elements of a SMIL document by client 110. In another embodiment, reporting component also reports execution of elements by another entity within CDN 102 such as execution of elements by RMSG 120. In various embodiments, reporting component 124 reports events and inputs to MRG 140, MS 130, third party network 150, content network 134, and/or any other entity that can receive such reports. It will be appreciated that various combinations of the above reporting scenarios can also be implemented within the context of the present invention.

Media server 130 provides primary multimedia content to client 110 as specified in a SMIL document. As used herein, primary multimedia content includes the majority of the multimedia content that makes up a multimedia presentation. For example, a user may wish to view a movie that is available from CDN 102. The user retrieves a multimedia presentation that includes the movie that the user wishes to view. The presentation can also include various advertisements or other companion content, but the primary content is the movie itself. Accordingly, in a multimedia presentation as described herein, companion content includes any content that is not the primary content. In various embodiments, primary multimedia content includes, for example, movies, TV shows, songs, speeches, slide shows, animations, other audio/video clips, and the like.

In an embodiment, primary multimedia content includes streaming content, which is understood to be multimedia content that is streamed to client 110. In various embodiments, streaming protocols are used to stream multimedia content to client 110 such as, for example, Real Time Protocol (RTP). In an embodiment, MS 130 streams primary multimedia content to client 110 via an RTP connection. In another embodiment, multimedia content is downloaded by client 110 from MS 130 such as, for example, over an HTTP connection. In various embodiments, MS 130 includes a database 132 for storing content such as, for example, primary multimedia content. In an embodiment, database 132 is located on the same machine as MS 130. In other embodiments, database 132 is located on a different machine than MS 130, and can be associated with MS 130 by a communication line. In an embodiment, database 132 includes only a single database, whereas, in other embodiments, database 132 includes more than one database. In an embodiment, for example, database 132 includes a database cluster. In various embodiment, MS 130 is configured to access content from database 132 and provide that content in various forms to client 110.

In other embodiments, MS 130 acts as a media proxy to forward multimedia content such as primary multimedia content to client 110 from an origin (i.e., source of content) external from MS 130. In an embodiment, the origin is a content server located outside of CDN 102. Such a content server can be located, for example, in another network such as, for example, content network 134 shown in FIG. 1, or may generally be contacted via the Internet. The description herein is not intended to limit the origin of multimedia content, and it should be understood by those of ordinary skill in the art that such content can be acquired from a variety of sources. MS 130 supports SMIL documents, and can also communicate with RMSG 120 and MRG 140 in order to facilitate synchronization of a multimedia presentation.

MRG 140 includes a generation component 142 for generating a multimedia presentation and an insertion component 144 for inserting companion content in a multimedia presentation. In an embodiment, generation component 142 generates a multimedia presentation by creating a SMIL document. A SMIL document generated by generation component 142 includes many of the features of the SMIL format understood by those skilled in the art. As used herein, however, a SMIL document includes additional or modified features as well, as defined by the various extended SMIL modules described below with reference to the Mobile Content profile.

Insertion component 142 facilitates the insertion of companion content into a multimedia presentation. Companion content can be inserted according to one or more of three different types of content insertion. The first type of content insertion includes pre-stitched content, which consists of a resolved media reference. Pre-stitched content, as its name implies, includes a direct media reference to a content location, where the reference is built into the SMIL document when the document is initially generated. The second type of content insertion is referred to as a static avail. A static avail includes a reference to a placeholder for companion content. In other words, a static avail is a reference that will eventually resolve to the location of the content that it references. This reference indicates that a pre-determination has been made that the primary content stream will be spliced at that point and content inserted. The third type of content insertion is referred to as a dynamic avail. A dynamic avail is traditionally known as a broadcast media avail. In the context of the present invention, a dynamic avail indicates a point in a multimedia presentation at which companion content may be inserted, based on satisfaction of various conditions requiring the insertion.

In one embodiment, insertion component 142 facilitates insertion of companion content by resolving references submitted by client 110. In an embodiment, a reference includes, for example, a URL or URI directed to some type of companion content. In an embodiment, insertion component 142 receives that reference and resolves it by fetching the companion content associated with a URL. In various embodiments, the companion content includes static content, dynamic content, or a combination of both. In other embodiments, the companion content includes pre-stitched content.

In an embodiment, insertion component 142 communicates the content fetched in resolving the reference directly to client 110, where the companion content is played in addition to other content (e.g., primary content) associated with a particular SMIL document.

In another embodiment, insertion component 142 communicates the companion content to MS 130, wherein MS 130 inserts the companion content into a stream of primary (and, possibly other companion content). It will be understood that insertion of companion content can be achieved in various manners such as, for example, splicing and play-listing. In an embodiment, MS 130 utilizes play-listing to present companion content. In a further embodiment, client 110 utilizes play-listing to present companion content communicated to it by MS 130. In either case the system performing the "splice" is merely switching from one piece of content in the play list to another, e.g., from primary content to companion content. This can be achieved by closing a current MPEG stream between MS 130 and client 110 and opening a new one.

Figure 2:
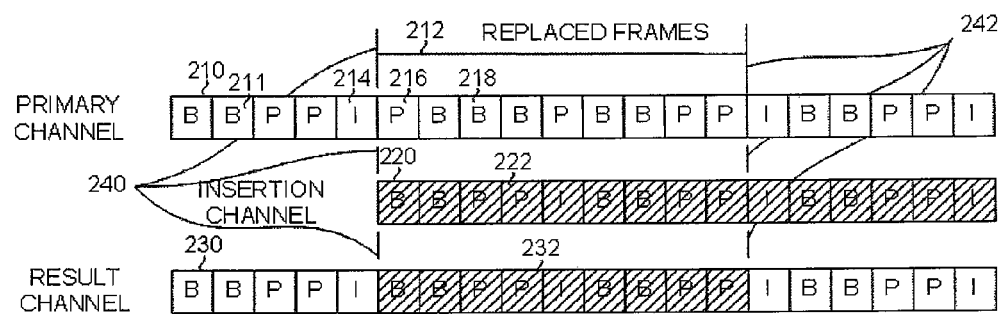
FIG. 2 is a block diagram illustrating an exemplary process of inserting frames of companion content into a primary content stream according to an embodiment of the present invention.

In another embodiment, MS 130 facilitates insertion of companion content by splicing the companion content into another media stream, such as the primary content stream. An illustrative example of splicing companion content into a primary content stream is shown in FIG. 2. As shown in FIG. 2, primary content is streamed to a client over Primary Channel 210 used for streaming primary content according to the common MPEG standards that drive video. The MPEG-1, MPEG-2 and MPEG-4 standards deliver video in terms of frames delivered as many Groups of Pictures (GOPs). As shown in FIG. 2, according to MPEG standards, each frame is a particular type which has specific purpose in the media stream. The three most common frame types are shown in FIG. 2: I-frames 214, P-frames 216, and B-frames 218. I-frames 214 are intra-coded pictures, which are fixed pictures that do not depend on any other frames for decoding. P-frames 216 are predictive coded pictures, which depend upon a preceding frame for decoding because a P-frame 216 contains the difference information from a preceding I-frame 214 or P-frame 216. B-frames 218 are bi-directionally predictive coded frames, which contain difference information between the preceding and/or following I-frame 214 or P-frame 216.

As illustrated in FIG. 2, when inserting companion content, which is provided by groups of frames 222 on an insertion channel 220, into primary content, which is provided by groups of frames 211 on a primary channel 210, the companion content frames 222 physically replace a set of frames 212 of the primary content. Thus, as shown in FIG. 2, if companion content is to play between a first time 240 and a second time 242, all of the frames 212 of the primary content that would play between time 240 and time 242 are replaced by a set of frames 232 from companion content to create a delivered content that is represented in FIG. 2 by result channel 230. It should be appreciated by those of ordinary skill in the art that there are alternative methods of inserting companion content into primary content not illustrated or described herein. Any of these various methods may be used in implementing the present invention without deviating from the functionality and intended scope of the invention.

In addition to generating SMIL documents for providing multimedia presentations to client 110, facilitating insertion of companion content, and synchronizing SMIL document execution between various elements within CDN 102, MRG 140 provides an interface between CDN 102 and external networks such as, for example, ad networks, additional content networks, monitoring networks, and the like. These external networks will be referred to herein, for simplicity and clarity, simply as third party networks. Third party network 150 is illustrated in FIG. 1, and its connection to CDN 102 through MRG 140 is also illustrated. The interface provided by MRG 140 between CDN 102 and third party network 150 facilitates transfer of aggregated targeting information for content and advertisements, privacy, and scalability.

Companion content such as advertisements, links to other content in which a user may be interested, reviews of content related to primary content, and the like can be targeted to a particular user that is associated with client 110. The present invention offers novel features associated with anonymizing user information used in targeting content such as, for example, by the operations of RMSG 120 as described above. Additional functionality is provided by MRG 140, including an ability to aggregate user information such that dynamic and intelligent decisions can be made regarding the targeting of content to a user of client 110.

According to an embodiment of the present invention, a SMIL document used to provide a multimedia presentation to client 110 includes various elements that, when executed by client 110, cause communications to be transmitted from client 110 to RMSG 120. In an embodiment, some elements include click through information reporting, wherein data representing an event that resembles a user click is passed automatically to RMSG 120 or MRG 140 upon the occurrence of a specified event. These automatic transmittals of data are referred to herein as click throughs, or alternatively (and interchangeably) click through information reporting. For example, in one embodiment, every time a pre-fetched or static ad is played by client 110, a click through is sent to MRG 140 for reporting to relevant entities of third party network 150 of FIG. 1A. In an embodiment, click throughs of this nature are generated at MS 130 and communicated directly to MRG 140. In another embodiment, these click throughs are generated at client 110, communicated initially to RMSG 120, and subsequently communicated to MRG 140.

Click throughs can be used to track served companion content, which may include ads or other content. In some embodiments, entities that provide companion content may wish to be notified each time one of their instances of companion content is served to client 110. In this case, the click through can be referred to as a click back, as the process results in a reporting back of the serving of an ad or other content so that the number of ads or other content served can be counted. Click backs can be initiated in various situations. Some examples of common times when a click back may be useful according to embodiments of the present invention include counting upon referral, counting on delivery attempt, counting on play, counting on delivery, and counting on view. Counting on referral is achieved by performing a click back on a query to a companion content server to get a referral to a content location. Counting on delivery attempt is achieved by performing a click back at the beginning of streaming of content from CDN 102 to client 110. Counting on play is achieved by performing a click back at the beginning of the playing of the companion content on client 110. Counting on delivery is achieved by performing a click back at the completion of streaming from CDN 102 to client 110 and counting on view is achieved by performing a click back at the end of the play of the companion content on client 110. It should be understood by those of ordinary skill in the art that different clients may be able to support different methods of performing click backs, and that, therefore, not all of the counting models described above can be used in every situation.

In an embodiment, the granularity of returned values constituting click backs is maintained by CDN 102 and third party network 150. If the ratio of click backs to ad is 1:1 then this can be reflected in the returned data. In some embodiments, multiple ads can be delivered in a single file, whereas the click backs are made for each ad in the file. In other embodiments, a single click back is made for the entire file. To achieve any of the scenarios and models described immediately above, with reference to click back tracking of companion content, several items can be defined and synchronized between CDN 102 and third party network 150. For example, the mechanism by which companion content referrals are resolved can be specified and maintained between CDN 102 and third party network 150. In another embodiment, the mechanism by which click backs occur is specified and maintained, particularly when click back tracking is performed in real-time. In any case, the document returned for companion content resolution should be specified and should support both the content resolution as well as the click through (e.g., click back) information necessary to achieve the desired process. Special attention should be paid to click back tracking with respect to pre-roll companion content (i.e., content that is played before the beginning of primary content). When a video stream is started and pre-roll companion content is present, two tasks can be completed. The first task is to gather the next set of companion content to be played. If click back tracking is performed, then the second task may be to get the click back URL for the pre-roll companion content (and other companion content returned in the first step). In an embodiment, this can all be completed as one transaction.

It should be appreciated that when providing and reporting on avails (i.e., companion content insertions), it is important to provide proper accounting. Tracking information regarding the number of avails played is important, as is tracking information regarding the total number of avails present. Other information such as, for example, the distance from the beginning to the end of the presentation can also be pertinent to companion content servers. Accordingly, a standardized method of creating avails may be useful.

Figure 5A:
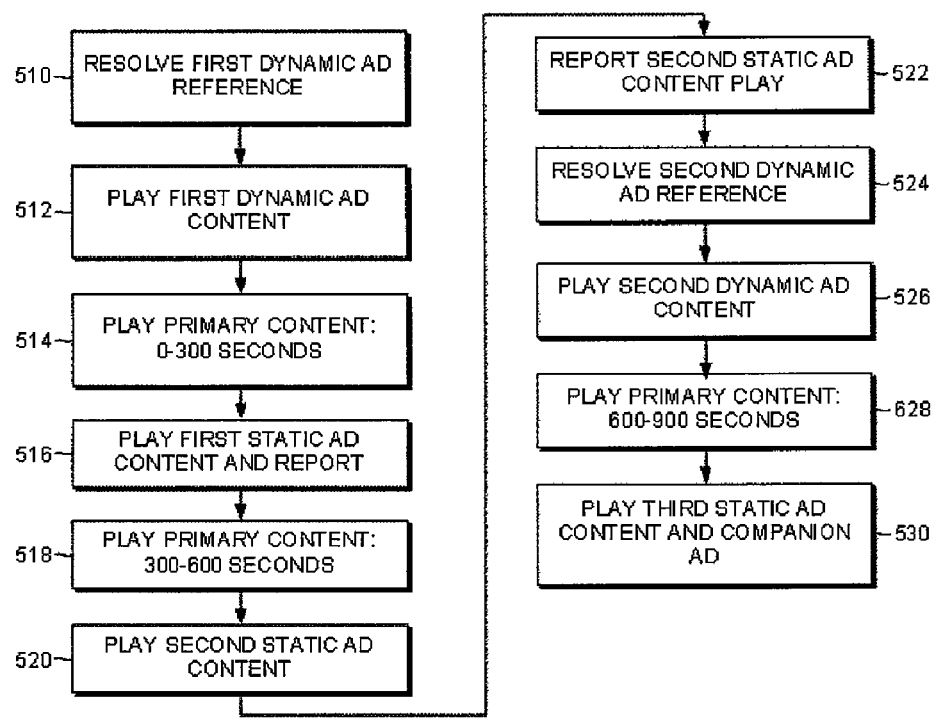
FIG. 5A is a flow diagram illustrating an exemplary method of executing a SMIL document according to an embodiment of the present invention.
Figure 5B:
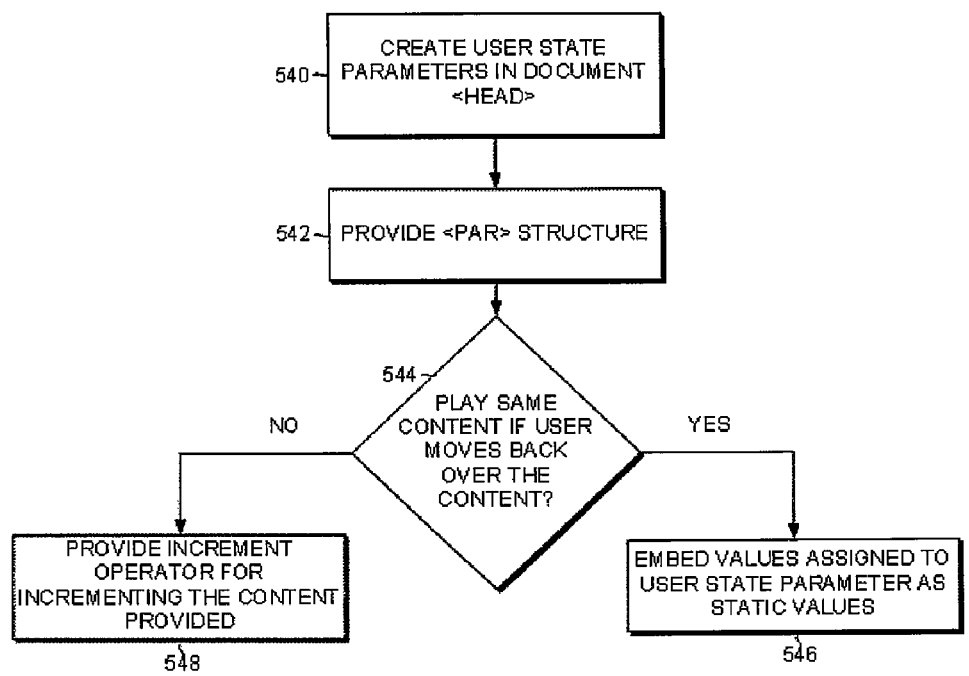
FIG. 5B is a flow diagram illustrating an exemplary method of creating avails in the context of a distributed SMIL document according to an embodiment of the present invention.

FIG. 5B illustrates an exemplary method for creating avails in the context of a distributed SMIL document according to an embodiment of the present invention. At a step 540, user state parameters are created in the <head> of the SMIL document. These user state parameters can include, for example, 'numberOfAvails' and 'availNum'. At a step 542, a <par> (parallel) structure is provided that contains all activities to perform for the necessary operations corresponding to the various avails. At a step 544, a determination is made whether the same content will be played if the user moves back over the content. If the determination is positive, as shown at a step 546, the values assigned to the user state parameter as static values are embedded using the <setvalue> directive with a static value. If not, as shown at step 548, an increment operator is provided. It should be understood that the exemplary method illustrated in FIG. 5B is only one example of many possible methods of creating avails in the context of the present invention.

Whether click throughs constitute click back tracking or click throughs for retrieving content, MRG 140 can store these click throughs in temporary or permanent databases. In various embodiments, the click throughs stored by MRG 140 are associated with client 110 and/or with the particular primary content that a user of client 110 is being provided. This association is achieved by tagging the click throughs with some form of identifier. Additionally, in some embodiments, MRG 140 forwards click throughs to relevant entities in third party network 150.

In addition to automatic click through information reporting, a SMIL document executed at client 110 can include elements that provide an interactive experience to a user of client 110. In embodiments, these elements are provided as impressions that include corresponding input regions for receiving user input. Impressions include the visual and audio display provided to a user. Input regions can include buttons, clickable areas of the screen, selectable icons, hyperlinks, and the like. Upon receiving user input via one of the input regions, a communication is transmitted from client 110 to one of the other elements of CDN 102. For example, in some embodiments, interactive ads are provided to a user of client 110, wherein if a user clicks on an ad, additional advertising content, product information, or links to a website associated with the product or service being advertised is provided to the user. In some embodiments, an input region corresponding to an ad impression itself constitutes a hyperlink to an associated website, whereby a user can access the site directly by selecting (e.g., clicking on) the ad. In some embodiments, the user input and subsequent response result in the primary content being paused or stopped. In other embodiments, additional content, websites and the like are provided in a separate portion of the screen or in an additional window on the screen.

Figure 4:
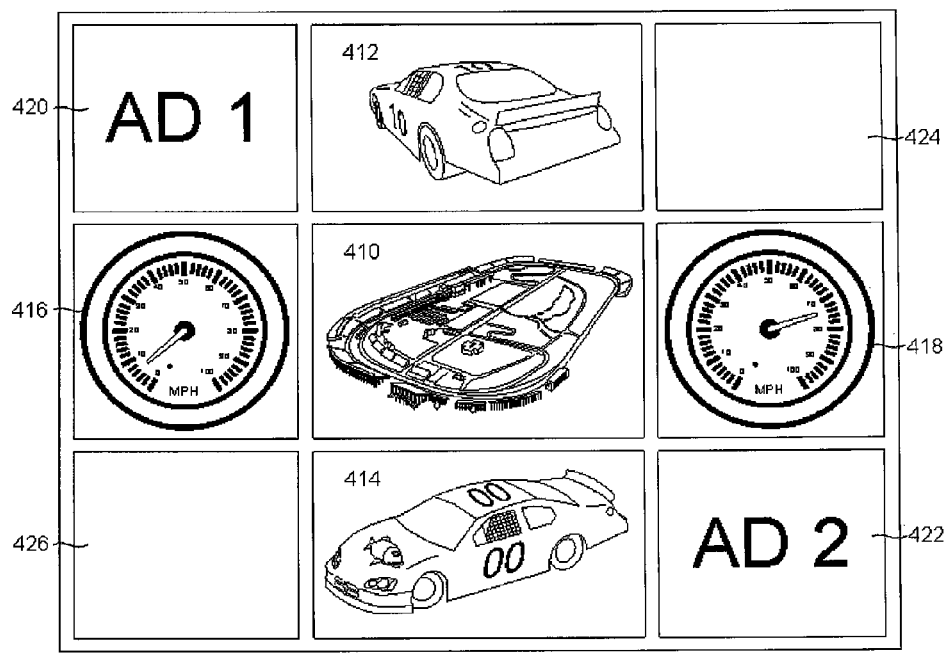
FIG. 4 depicts an illustrative screen display of an executed media document according to an embodiment of the present invention.

Turning briefly to FIG. 4, an exemplary screen 400 rendered on a display by execution of a SMIL document in accordance with an embodiment of the present invention is shown. Although the display is shown as being divided into nine different regions, other representations are contemplated by the present invention. For example, in an embodiment, only one region of screen 400 is displayed, showing the primary content, wherein companion content is inserted in various ways into the single screen. In various other embodiments, other numbers of regions or screens are displayed, depending on the nature of the SMIL document. As shown in the embodiment illustrated in FIG. 4, screen 400 displays the primary content, which is a car race. Because of the versatile nature of SMIL documents, various options exist for displaying such events, some of which are illustrated herein. For example, the center region 410 of screen 400 includes a view of the entire racetrack. Another region 412 includes a rear view of a particular car that is racing. Other regions can include views from other cameras situated in various places at the race event such as, for example, the views illustrated in FIG. 4. The side view of a different car is shown in a region 414. A region 416 and a region 418 each show a different speedometer, the video of which may be captured by cameras located within the respective cars.

It will be appreciated by those of ordinary skill in the art that the use of SMIL documents to provide multimedia presentations provides features such as the features illustrated herein, which may be extended, modified, or adapted to a myriad of different events and situations. The illustration and description herein of a particular type of event and particular views associated therewith is not intended to limit the use or functionality of SMIL documents for providing multimedia presentations within the ambit of the present invention.

With continued reference to FIG. 4, a region 420 of screen 400 provides an impression of an advertisement, AD 1. In various embodiments, various types of companion content can be provided in various regions of a screen. Both the region on the screen and the order of occurrence of companion content can each be referred to as the content's position. The position is relevant in terms of letting third party network 150 know how far into a primary content (e.g., video) the companion content is to be played. In some embodiments, companion content is played at a position determined by a linear relationship with respect to primary content. A linear relationship exists when companion content is played after a predetermined number of frames of primary content is played. In another embodiment, companion content is played at a position determined by a temporal relationship, wherein the companion content is played after a predetermined amount of time of playing the primary content. In further embodiments, companion content is played at particular positions within the screen (e.g., top left, bottom right, etc.).

Referring again to FIG. 4, a region 422 of screen 400 also provides an impression of an advertisement, AD 2. Note that regions 424 and 426 can provide any number of displays such as, for example, additional views associated with the primary content, additional advertising material, links to websites, links to promotional material, playlists, links to product retail sites, and the like. In an embodiment, regions 420 and 422 include input regions capable of receiving user input. Incident to receiving user input to an input region associated with an AD 1 or AD 2, the user is further provided with advertising material, updated product or service information, access to a website associated with a company corresponding to the ad, and the like.

Returning to FIG. 1A, the role of MRG 140 in providing targeted advertising in connection with displayed content such as that described above with reference to FIG. 4 shall be further described herein. In an embodiment, when user input is received via an input region associated with a displayed impression or other content, the user input triggers communication from client 110 to RMSG 120 or MS 130. For example, a user can click on an ad that has an associated input region corresponding to a link to an entity's website. Upon clicking on the ad, a request for the URL corresponding to the website is communicated to RMSG 120. After anonymization, that request is further communicated to MRG 140 in the form of a reference. MRG 140 resolves the reference by retrieving the website associated with the URL and providing that content to client 110. Additionally, MRG 140 can log (i.e., store) a record of the communication and associate the record with client 110 by using an identifier.

As MRG 140 builds a collection of records related to various communications associated with client 110, models can be generated which attempt to describe patterns of behavior, preference, reaction, and the like associated with a user of client 110. These models can be used to improve the targeting of content to the user of client 110. In various embodiments, MRG 140 combines learned knowledge of a user of client 110 with knowledge it has acquired regarding other clients and/or users, and builds, models related to specific demographics associated with users. For example, in one embodiment, MRG 140 is able to predict that users of certain age groups or genders may prefer certain types of content, or may react in particular ways to certain types of content. In this way, companion content can be targeted to users in an efficient and optimized manner. In some embodiments, MRG 140 makes decisions regarding the type of companion content to return to client 110 in response to certain requests. In other embodiments, MRG 140 provides information, in the form of analytics to entities associated with third party network 150, wherein those entities are responsible for making such decisions. Analytics can be communicated directly to third party network 150. In another embodiment, analytics are appended to click throughs or other communications directed toward third party network 150, in which case the analytics can be referred to as tags.

In addition to facilitating improved targeting of content to users of client 110, MRG 140 provides a layer of anonymization for facilitating privacy in communications between third party network 150 and elements of CDN 102 or client 110. Privacy concerns may apply to client 110 as well as any other element of CDN 102. To maintain privacy of the various elements and client 110, MRG 140 masks various types of information such as, for example, user or server identification information, in communications that are transmitted between CDN 102 and third party network 150. By providing a single interface between the two networks, MRG 140 optimizes such privacy services, and improves the ability to monitor and maintain privacy services, as well as to adjust, implement, or retract various privacy policies and security measures.

Another advantage to providing a single interface between CDN 102 and third party network 150 is related to scalability. MRG 140 facilitates the ability to scale-up a large CDN 102 without the necessity of increasing the number of connections to third party network 150. FIG. 1B shows an illustrative networking environment according to an embodiment of the present invention. As shown in FIG. 1B, MRG 140 provides a scalable interface between CDN 102 and third party network 150. In an embodiment, MRG 140 provides the interface by maintaining a single connection 145 to third party network 150. In another embodiment, the single connection 145 is created only when information is communicated between MRG 140 and third party network 150.

As shown in FIG. 1B, a plurality of network element clusters 160A, 160B, 160C, and 160D communicate with MRG 140. Each of clusters 160A, 160B, 160C, and 160D includes a client 111, RMSG 121, and media server (MS) 131. It should be understood that, although FIG. 1B depicts client 111 as being an element of CDN 102, this representation is shown for the purposes of simplicity and clarity. In some embodiments, client 111 is considered to be an element of CDN 102, whereas in other embodiments such as the embodiment illustrated in FIG. 1A, client 110 is considered to be an element outside of CDN 102. In either case, the scaling functions provided by MRG 140 operate similarly.

In the embodiment shown in FIG. 1B, MRG 140 receives communications from elements of clusters 160A, 160B, 160C, and 160D. These communications can, as described above, with reference to FIG. 1A, originate at client 111, RMSG 121, or MS 131. In some instances, client 111 communicates click through reporting information to RMSG 121, which removes or masks any client-specific identifying information. RMSG 121 then communicates the click through reporting information to MRG 140, which forwards the communications to an appropriate entity or entities within third party network 150. In some embodiments, MRG 140 removes additional data that is either client-specific, CDN-specific, or RMSG-specific before forwarding the communication to third party network 150. In this manner, MRG 140 anonymizes any or all of the elements of CDN 102 with respect to third party network 150.

In various embodiments, MRG 140 receives a plurality of communications from a plurality of clusters 160A, 160B, 160C, and 160D and forward each of the communications to the proper entities in third party network 150. In an embodiment, the single connection 145 includes a connection to the Internet, whereby third party network 150 can be accessed. Similarly, communications from third party network 150 can be routed by MRG 140 to appropriate network elements within CDN 102. In some embodiments, MRG 140 is adapted to provide network address translation (NAT) services to facilitate the anonymity of various CDN 102 elements. In other embodiments, a separate gateway or proxy server is used to provide NAT services, and the separate gateway or proxy server can be situated between MRG 140 and third party network 150. It should be appreciated that any of the elements illustrated in FIG. 1B are scalable. That is, there may actually be many more clusters 160A, 160B, 160C, and 160D and/or a plurality of MRGs 140. Additionally, each cluster 160A, 160B, 160C, and 160D can include a varying number of clients 111, RMSGs 121, and MSs 131. Various possible combinations and configurations as suggested by these embodiments may be implemented within the ambit of the present invention.

Figure 1B:
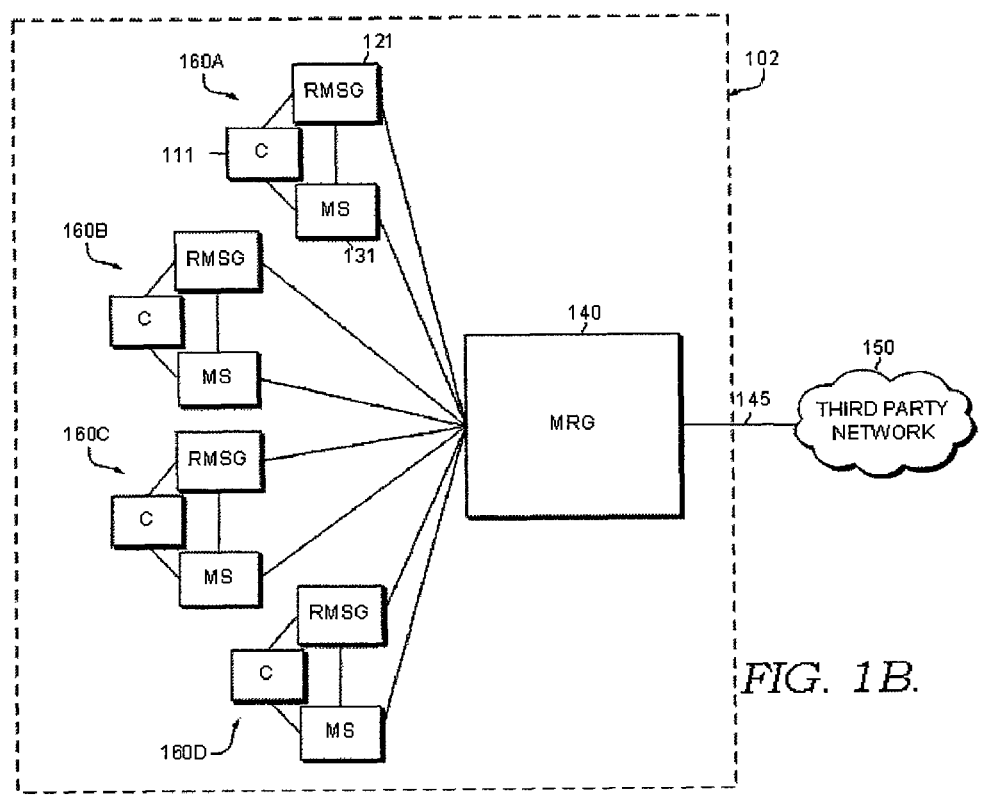
FIG. 1B is a block diagram illustrating an exemplary networking environment suitable for implementing embodiments of the present invention.
Figure 3:
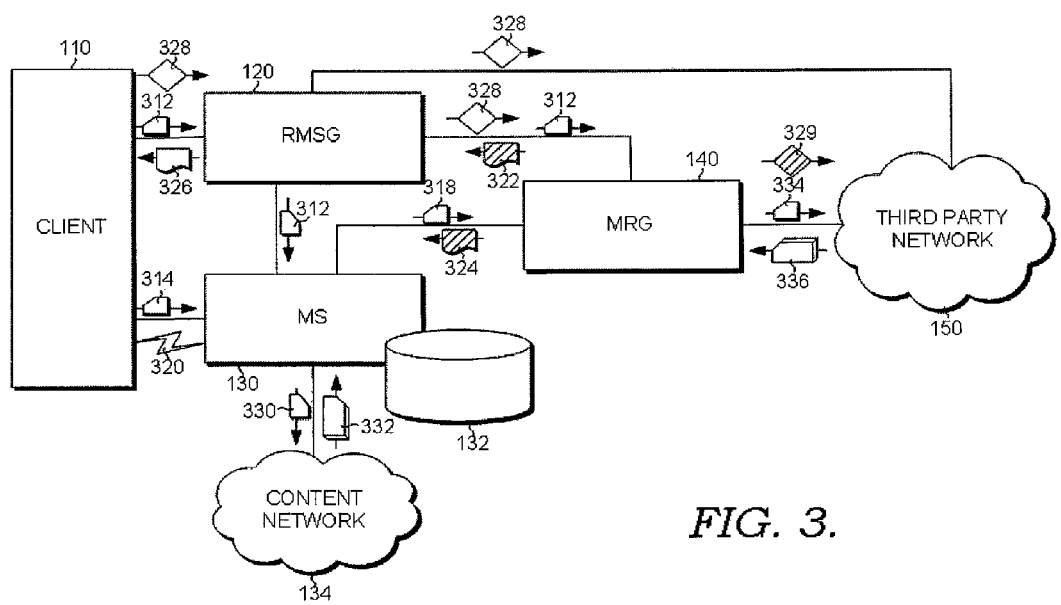
FIG. 3 is a schematic diagram illustrating exemplary communications between network elements according to an embodiment of the present invention.

Turning now to FIG. 3, a schematic diagram of illustrative communication flows between the elements illustrated in FIG. 1A according to an embodiment of the present invention is shown. As illustrated in FIG. 3, client 110 communicates an initial request 312 for a multimedia presentation to RMSG 120. As described above, RMSG 120 anonymizes initial request 312 by removing client-specific information that can be used to identify client 110. After anonymizing initial request 312, RMSG 120 forwards initial request 312 to MS 130 and MRG 140. In some embodiments, initial request 312 is forwarded only to one or the other of MS 130 and MRG 140. As further illustrated in FIG. 3, client 110 also requests initialization of a stream connection (e.g., an RTSP or RTP connection) between client 110 and MS 130 by communicating connection request 314 to MS 130. In response to connection request 314, a connection 320 is established.

Upon receiving initial request 312, MRG 140 creates a SMIL document configured for facilitating provision of the requested multimedia presentation. In various embodiments, MRG 140 uses a template document as a basis for the SMIL document that it creates. In an embodiment, the template document is retrieved from database 132 located at MS 130. This is particularly the case when the primary content is a video-on-demand (VOD) or some other content that is stored on CDN 102. In other embodiments, the template document is stored or created by MRG 140.

MRG 140 communicates a first copy 322 of the SMTh document to RMSG 120 and a second copy 324 of the SMIL document to MS 130. In an embodiment, the SMTh document includes a plurality of executable elements. In various embodiments, executable elements include various combinations of client-executable elements (i.e., executable by client 110), MS-executable elements (i.e., executable by MS 130), and/or RMSG-executable elements (i.e., executable by RMSG 120). In one embodiment, copies 322 and 324 of the SMIL document each include all of the same elements. In other embodiments, copies 322 and 324 are actually different documents, each one only including elements executable by its various destination entities.

With continued reference to FIG. 3, first copy 322 of the SMIL document is received by RMSG 120. RMSG 120 inspects first copy 322 to determine which elements are client-executable and which elements are not client-executable. This includes a determination of which elements are RMSG-executable. RMSG 120 duplicates first copy 322 and removes all executable elements that are not client-executable from the duplicate. This process can be referred to as stripping the SMIL document. In this manner, the stripped document 326 that is returned to client 110 is of a manageable size and, because it is free of superfluous executable elements (from the perspective of client 110), the document can be executed more efficiently by client 110.

After receiving stripped document 326, client 110 executes stripped document 326. During execution of stripped document 326, streaming multimedia content is served to client 110 from MS 130 through connection 320. Streaming multimedia content can originate at MS 130, where it is stored in database 132. In other embodiments, streaming multimedia content originates at a different entity such as, for example, an entity located in an external content network 134. If that is the case, as shown in FIG. 3, MS 130 communicates a request for the content to an entity in content network 134. In response, multimedia content 332 is provided to MS 130 from content network 134. Multimedia content 332 is then served by MS 130, or through MS 130 (where MS 130 acts as a proxy server) to client 110.

According to an embodiment of the present invention, during the multimedia presentation, click through events occur such as, for example, click back tracking of ads served. Data is passed from client 110 by click through 328. Click through 328 is passed, as shown in FIG. 3, to RMSG 120, and subsequently passed to MRG 140. Additionally, if an entity in third party network 150 requests direct receipt of click through 328, RMSG 120 can communicate click through 328 directly to third party network 150, as shown in FIG. 3. In lieu of this communication, or in addition to it, RMSG 120 passes click through 328 to MRG 140. Data associated with click through 328 can be stored, processed, and/or analyzed by MRG 140, and resulting analytics 329 that may assist an entity in third party network 150 in providing targeted content are communicated by MRG 140 to third party network 150.

As client 110 executes stripped document 326, callouts (not illustrated in FIG. 3) can also be communicated from client through RMSG 120 or MS 130. These callouts, which are forwarded to third party network by MRG 140 in a communication 334 facilitate the request for provisioning of companion content 336 from third party network 150. In response, third party network 150 provides companion content 336 to CDN 102 via MRG 140. This content can then be communicated to client 110 through RMSG 120 or MS 130 (this communication is not shown in FIG. 3.). It will be understood by those of ordinary skill in the art that the communication flows illustrated in FIG. 3 are merely exemplary communications illustrated for clarity, and that any combination of them, including combinations of communications not illustrated, may be implemented in accordance with various embodiments of the present invention.

The dynamic functionality provided in embodiments of the present invention is enabled not only by a distributed and synchronized CDN, but also by various modifications and extensions to the SMIL specifications. In particular, the present invention includes a new SMIL profile that is different from any of the previously existing SMIL profiles. For purposes of simplicity, the SMIL profile defined by the present invention shall be referred to herein as the Mobile Content profile, although this name is not intended to limit the use of the profile to implementation on mobile devices, but is used for clarity as the Mobile Content profile is actually an extension and modification of the SMIL Mobile Profile. The Mobile Content profile is focused on common media operations like avail support and reporting.

Achieving the functionalities described above can be accomplished using the Mobile Content profile described below within the context of particular configurations related to CDN 102 and client 110. For example, in various embodiments, some of these configurations include a set of criteria for the system as a whole, for CDN 102, and/or for client 110. Although a discrete set of criteria are set forth below, this list is not intended to limit the possible configurations that may be implemented within the context of embodiments of the present invention. For example, various combinations of these criteria may be implemented. There is no requirement that any and/or all of these criteria be defined in various implementations of the present invention. However, some functional aspects of the invention may be efficiently realized given the implementation of some of the following criteria.

In various embodiments, the system is required to adhere to a set of general criteria. Some of these criteria include, for example, that the system shall support all forms of inter-stitial rolls, that the system shall support all click back models, that the system shall support the ability to send a single click back to multiple destinations, that the system shall support the ability to specify its own content as part of media object references, that the system shall support dynamic avails, and that the system shall support pre-fetch of avails. In embodiments, CDN 102 criteria includes, for example, that CDN 102 shall support the ability to store pre-ingested content, that CDN 102 shall support the ability to ingest uncached content in real time, that CDN 102 shall support the ability to cache content, that CDN 102 shall be able to ingest a standard DVD VOB file and create a SMIL document, that CDN 102 shall support live television broadcasts, and that CDN 102 shall support personas instead of user identities.

Exemplary client criteria can, in various embodiments, include criteria such as that when clicking on companion media the user experience can be controlled via the 'sourceState' and 'destinationState' attributes per the SMIL specification. In some embodiments, client 110 has to comply with launch options described in the SMIL specification. In other embodiments, client 110 could send a more detailed structure similar to a CC/PP description that would inform RMSG 120 of each slot, the position (Top Left, Top Right, etc), dimension, number of rich slots that can be supported simultaneously, and the like. Again, it is noted that none of these exemplary criteria is required in implementing various embodiments of the present invention.

Similarly, additional general criteria can be implemented for providing a consistent experience for the user. Such criteria can include, for example, criteria specifying that: known videos with the content URI scheme will be marked as <video> media whether they are ads or not; the beginning and end times of the clips (clipBegin and clipEnd) may be specified; the duration of each element (dur) or the duration of the allowed splice points, which allows MS 130 to figure out when the next splice point should be given may be specified; for an ad query, the returned SMIL document may be required to contain a sequence <seq>; click through may be required to be represented as anchor media <submission> with the appropriate href and parameters; for click on play the click through and clip may be required to be wrapped in a parallel structure <par>; for click on completion the click through may be required to be after the clip but in parallel with the next clip; it may be specified that synchronized companion media can be included as anchor tags <a> or represented as other media object types include references <ref>; statically referenced ads that must be tracked may be required to include the click through may be required as part of the SMIL document; in the event that conditions preclude the use of companion media (i.e., the numcompanions state attribute>0) but it is still desired to treat the anchor as a click through then the property then a any <a> element may be required to be set with the test (expr="numcompanions > 0") and a <submission> element are included with the converse (expr="numcompanions &eq 0"); linear content like streaming video may be required to be represented in the SMIL<body> as a sequence; and the model chosen for tracking may be required to include a count associated with the ad once the content has started playing (aka 'count on play').

As indicated above, the Mobile Content profile, which provides an extension of the SMIL Mobile Profile, is utilized in embodiments of the present invention. The following modules are recommended for supporting this specification by all agents (client 110, RMSG 120, MRG 140 and MS 130): SMIL 3.0 StateTest Module; SMIL 3.0 UserState Module; SMIL 3.0 StateSubmission Module; SMIL 3.0 MediaParam Extensions (which are described below and are unique to the present invention); and SMIL 2.1 Mobile Profile. The Mobile Content profile includes the elements listed in Table 1.

TABLE 1

User Agent Profiles

| Collection Name | SMIL Version | Elements in Collection |
| --- | --- | --- |
| ContentControl | 2.1 | switch, prefetch |
| Layout | 2.1 | region, root-layout, layout, regPoint |
| LinkAnchor | 2.1 | a, area |
| MediaContent | 2.1 | text, img, audio, video, ref, textstream, param, paramGroup |
| Metainformation | 2.1 | meta, metadata |
| Structure | 2.1 | smil, head, body |
| Schedule | 2.1 | par, seq |
| Transition | 2.1 | transition |
| StateTest | 3.0 | expr attribute |
| UserState | 3.0 | state, newvalue, setvalue, delvalue |
| StateSubmission | 3.0 | send, submission |
| State Interpolaton | 3.0 | No elements defined in this module |
| (Extended) MediaParam | N/A | useas attribute |

In accordance with an embodiment of the present invention, semantic changes have been made to the MediaParam module as defined in the Mobile Content Profile. The change introduces a shorthand notation, primarily for the purpose of reducing the overall size of the SMIL document. The functionality imparted by the change may be illustrated as follows. If the type attribute is "ref" and begins without a scheme, the value is interpreted as an XPath that must evaluate to a node-set. An error occurs if the node set does not refer to exactly one node. Although this semantic change appears to be minor, it is important in maintaining a manageable document that can be efficiently executed and synchronized across CDN 102.

A more significant change has been made to the User State Module for the purposes of the present invention. The extension made to this module allows CDN 102 to define its own data model without the requirement of changing the agent used. The change can be made within the SMIL document itself. For example, in an embodiment, CDN 102 defines a data model specific to viewing a particular type of streaming event such as a car race. The value attribute defined in the <state>, <newvalue>, <setvalue>, and <devalue> attributes are configured to be capable of accepting a simple expression language. This change is also made for the purposes of efficient synchronization and maintaining a document of manageable size. The specified simple expression language shall support the operators illustrated in Table 2. The expressions referenced therein are evaluated in linear order. Additionally, <data> elements may use the expr attribute. Similarly, although it is not reflected in Table 2, the Mobile Content profile extends previous SMIL specifications by allowing <metadata> and <meta> elements to use the expr attribute.

With reference to Table 2, by introducing the rand operator, cache-busting can be performed, which forces the RMSG and/or third party network to treat a click as if it is a totally different request. Previously, without this operator, SMIL agents were unable to generate random numbers, and each click sent to a server would result in the same value being returned.

TABLE 2

| Operator | Description |
| --- | --- |
| ( ) | parenthetical grouping |
| + | Addition |
| − | subtraction |
| * | Multiplication |
| div | division (real) |
| rem | remainder |
| inc | increment (Add 1) |
| Dec | decrement (Subtract 1) |
| rand | random number generator |
| reference | A reference to some value. It is the name of the value |

The most significant extension that the Mobile Content profile provides over previous SMIL specifications is the change in the meaning of the Submission Module. Originally the Submission Module was designed to simply send user state. In accordance with the present invention, the meaning of the Submission Module has been altered such that sections of the original SMIL document may actually be replaced by sending submissions. Previously, although the return semantics were not specified, they were assumed to affect the user state. The extensions to this module expand the semantics of returned values as well as creating events and storage for them.

According to the extended Submission Module of the present invention, the replace attribute contains three values. One value, all, relates to the entire presentation. None, the default value, does nothing, and the last value, instance, replaces instance data whose target is in the data model. The semantic value of the instance value is extended by the Mobile Content profile. When the where attribute is not accompanying the element and it is in the SMIL <body>, the return value is assumed to replace the node represented by the element. Thus, by implementing the extensions defined in the present invention, the entire SMIL document no longer needs to be replaced in response to a return from a submission. This extension allows for replacing only a particular line in the SMIL document as well as the ability to send a single user request and get back a large amount of information such as, for example, an advertisement, clicks, another submission that will send an additional request at some later time, and the like. It should be appreciated that this extension provides the ability to have a completely dynamic document.

Additionally, the attribute dur (duration) is used in a submission or send element to note when the transaction times out. A timeout( ) event will be generated by the element if a protocol appropriate response does not occur. If no duration is specified, then a default value is assumed. That is, every submission must have a timeout value, otherwise the element will remain active and the multimedia presentation may not progress.

The above functionality and extension offered by the Mobile Content profile is further enabled by changes to the Event Model and Behavior elements. Supported events for submission are formally specified in the Mobile Content profile. These events let the document authors capture when submissions timeout and capture the return event so that more complex processing than simply storing the return value may occur. The timeout( ) event is raised by a <send> element. This event bubbles in order to permit document handling on errors (e.g., aborting the presentation on any error). The receive( ) event is raised by a <send> or <submission> element. This event is raised when a request is sent to the URL represented in the element. If no URL is in the element then this element cannot generate the event. Additionally, the complete( ) event is raised by a <send> element upon successful completion of the send event.

It should also be noted that, according to the Mobile Content profile, if the <send> element is triggered by the receive event via an HTTP GET, then the response is returned to the client that initiated the event. When the <send> element contains a replace attribute with the value of "instance" and no ref attribute, the value returned will be used to replace the <send> element at its location in the SMIL presentation. The time container will continue. All of the timing elements that are introduced by the insertion will be evaluated. For instance, any begin events will occur immediately for active elements that are referenced by the inserted SMIL snippet.

The Mobile Content profile enables much of the functionality described above. For example, dynamic avails make use of the flexibility inherent in the Mobile Content profile. It should be noted that, to effectively present a dynamic avail, the pre-fetch must occur before the media is needed. Therefore, the timing of this operation is based upon the end of the previously played element.

An additional consideration related to the use of a SMIL document in the context of the CDN described above with reference to FIG. 1A is the ability to use a single document enabled with role-based execution. That is, the document must contain instructions or other code that ensure that particular elements of the CDN execute only the elements that they are required to execute. Accordingly, the user state model for these network elements requires an agent-id state attribute. Using the expr attribute, as defined in the context of the Mobile Content profile will permit element-specific commands to be executed. It should be understood that, in the context of SMIL, an agent is a network element, as network elements have been defined herein.

The following example, Example 1, is an example of the use of the Mobile Content profile in creating a single document having elements executable by particular agents. It should be noted that an agent-id attribute can be specified and passed but it may not be overwritten by a SMIL document directive (i.e., it is read-only in the user state model). Additionally, implementations of the MRG and the RMSG can remove elements from the documents they forward if the expression only evaluates to their particular agent-id. This capability permits some level of security in the document distribution process (i.e., IP addresses do not have to be exposed to all agents in the CDN).

Example 1

```
. . .
<agent-id>28972-2304823048</agent-id>
. . .
<par expr="agent-id &eq 28972-2304823048">
<video id="prestitch_ad_1"
src="content://ZlcmFuY2Ugb2YgZGVsaWRo"/>
<seq>
   <setvalue ref="availnum" value="1"/>
   <send submission="availServed"/>
</seq>
</par>
```

In various embodiments of the present invention, the CDN provides live content to a client. In this case, communication flows are required from the MS to the MRG and RMSG. The MRG forwards requests to a companion content system, which will reply to the MRG. In the case of live content, the SMIL document can be issued on an essentially piecemeal basis. This is achieved by using a new attribute in the <send> element. This attribute timeout will set the number of seconds required to elapse before it is determined that a timeout has occurred. The response can be either another send including a pre-defined timeout or a response denoting an avail. The overall time for the notification may be selected to be any duration. In an embodiment, the overall time for the notification is selected to be at least 4 seconds. It will be understood that the overall time for notification can, however, be selected to be any duration. The following example, Example 5, illustrates this concept. In Example 5, a live broadcast has begun and the CDN is designed to send a SMIL update no later than every 300 seconds. At time 210 seconds a cue tone is received. The immediate response from the system, which will include a change in the update state, is illustrated in Example 6. The events of Example 6 have the direct effect of ending the seg_start video due to the change of the setvalue. The avail is played and the content is picked back up at the splice out point. Another submission may also occur, as illustrated in Example 6.

Example 2

```
<state>
<session>
   <updateFlag xml:id="update">0</updateFlag>
   ...
   <submission xml:id="nextSegment" action="http://<VSS element>/{sessionID}" replace="instance"/>
<seq>
   <video xml:id="seg_start" src="content://<Streamer Address>/channels/live/12" end="update.change( )>
   <send submission="nextSegment" begin="seg_start" dur="300s"/>
<seq>
```

Example 3

```
<setvalue ref="update" value="0"/>
<seq>
   <avail . . . >
   <video xml:id="seg_start 2" src="content://<Streamer Address>/channels/live/12" clipBegin="splice out time"
      end="update.change( )>
   <send submission="nextSegment" begin="seg_start_ 2"
      dur="300s"/>
   </seq>
```

To recapitulate, we have described an aspect of the invention that relates to providing a dynamic multimedia presentation while maintaining client anonymity. With reference to FIG. 5A, one embodiment of the method is illustrated. An example of a SMIL document that provides a presentation in accordance with the exemplary method of FIG. 5A is also illustrated in Example 4 below. The exemplary method includes, at a step 510, resolving a first dynamic ad reference, http://ARGServer/GetAd.pl. At step 512, the document returned as a result of the resolution in step 510 is played. In various embodiments, this document includes ad content or other content, and the impressions played may include various types of media such as, for example, video, audio, static images, banners, and the like.

At step 514, the primary content, which is identified by content://GlzIGRpc3Rpbmd1aXNoZW4 is played, starting at 0 seconds and ending at 300 seconds. At step 516, first static ad content is played and a click through is performed as well. The first static ad content illustrated in FIG. 5A is identified by content://bmR1ZmF0aWdhYmxIIGdlb3. The click through is sent to a first ad server, AD1, located at http://track/AD1/coolRun/ and the results from the click through are ignored. As illustrated at step 518, the primary content is then played again, starting at 300 seconds and ending at 600 seconds. At step 520, second static ad content is played. This ad content is identified by content://ZlcmFuY2Ugb2YgZGVsaWdo. After the second static ad content has played, a click through is performed to a second ad server, AD2, and the resulting content that is returned is ignored, as shown at step 522.

At step 524, a second dynamic avail (reference to ad content) is resolved, resulting in a response including the content. The second dynamic avail resolved in this step is located at http://ARGServer/getad.pl. As illustrated at step 526, the returned content is played. Following the second dynamic ad content's completion, the primary content is played once again, as illustrated at step 528. The primary content is played starting at 600 seconds and ends at 900 seconds. In a final illustrative step, step 530, third static ad content is played simultaneously with another advertisement, which is displayed. The displayed advertisement may include a banner or other static image. It should be understood that the exemplary method described herein is only an example of a series of events associated with a SMIL document in accordance with an embodiment of the present invention. Other configurations are contemplated by the discussion herein, and the functionality enabled by the Mobile Content profile and the architecture described herein may provide a myriad of options for configuring and executing a SMIL document.

Example 4

```
<smil xmlns="http://www.w3.org/2005/SMIL21/Language">
   <head/>
   <body>
      <!--- The submissions for ad clickthroughs -->
      <submission id="sub1"
         action="http://track/AD1/coolRun/"/>
      <submission id="sub2" action="http://track/AD2/cool/"
         ignore="true"/>
      <seq id="main feature">
         <!--- This is a dynamic Pre-roll -->
         <ref id="dyn_ad_1" src="http://ARGServer/GetAd.pl"
            restart="never"/>
         <!--- This is part one of the main feature -->
         <!--- followed by an ad break -->
         <video id="main_1"
            src="content://GlzIGRpc3Rpbmd1aXNoZW4"
            clipBegin="0s" clipEnd="300s"    />
         <!--- This is a static mid-roll ad
            with a click through on play -->
         <par>
            <video id="stat_ad_1"
               src="content://bmRlZmF0aWdhYmxlIGdlb3" />
            <send submission="sub1"/>
         </par>
         <!--- This is part two of the main feature -->
         <!--- followed by an ad break -->
         <video id="main_2"
            src="content://GlzIGRpc3Rpbmd1aXNoZW4"
            clipBegin="300s" clipEnd="600s"/>
         <!--- Another static mid-roll ad with a click through
            after play-->
         <video id="stat_ad_2"
            src="content://ZlcmFuY2Ugb2YgZGVsaWdo" />
         <send submission="sub2" method="post"
            replace="none"/>
         <!--- This is yet another dynamic mid-roll ad -->
         <ref id="dyn_ad_2" src="http://ARGServer/getad.pl"   />
```

-continued

```
<!--- This is the final part of the main feature -->
<video id="main_3"
    src="content://GlzIGRpc3Rpbmd1aXNoZW4"
    clipBegin="600s" clipEnd="900s"/>
<!--- This is a static Post-roll with no click
through and a companion ad -->
<par restart="never">
    <video id="stat_ad_3"
        src="content://hlIG1pbmQsIHRoYXQgYnkg"  />
    <a href="http://foo.com/displayAd3"  />
</par>
    </seq>
  </body>
</smil>
```

As indicated above, one aspect of the present invention includes providing anonymity to a client while providing a rich multimedia presentation experience. In addition to traditional anonymizing techniques that may be employed by particular elements of the CDN such as the RMSG, the SMIL document may also include functionality in this regard. For example, in an embodiment, the MS may receive its information via the RTSP PLAY and SETUP messages. It may also be important to protect the user identity. This can be achieved via only have an encrypted token transmitted to the MS via the MRG. This token can be used to generate other tokens used in advertising or other third party communications. Accordingly, the token is never shared outside of the MS, MRG, and the CDN. The MS performs a mapping between RTSP and SMIL by assuming the various data elements in its model along with those that are mandatory for all agents. For example, in an embodiment, the data in the MS may include the following attributes as part of a <session> element: rtspSessID, which reflects the fact that the RTSP Session ID may be generated as part of the client/MS communication; encUserToken, which reflects the fact that an encrypted user token is sent to the MS; and activeContentURI, which indicates the URI of the content that was requested or is currently being played.

Subsequent to the events described above, in response to the request being sent to the MS, the MS may submit all of its state data as if it were expecting a complete update of the SMIL document. Specifically, the MS may execute the following:

<submission xml:id="mrgUpdate" expr="agent-id &eq 28972-2304823048" action="http://mrg address/"/>

<send submission expr="agent-id &eq 28972-2304823048" submission="mrgUpdate" replace="all" method="get" restart="always"/>

This creates an HTTP GET with the state information to replace the entire SMIL presentation. The MRG will send back state information, however, will only change some of the parameters. Additionally, in an embodiment, values under the session element are only sent back to the MS.

Figure 6:
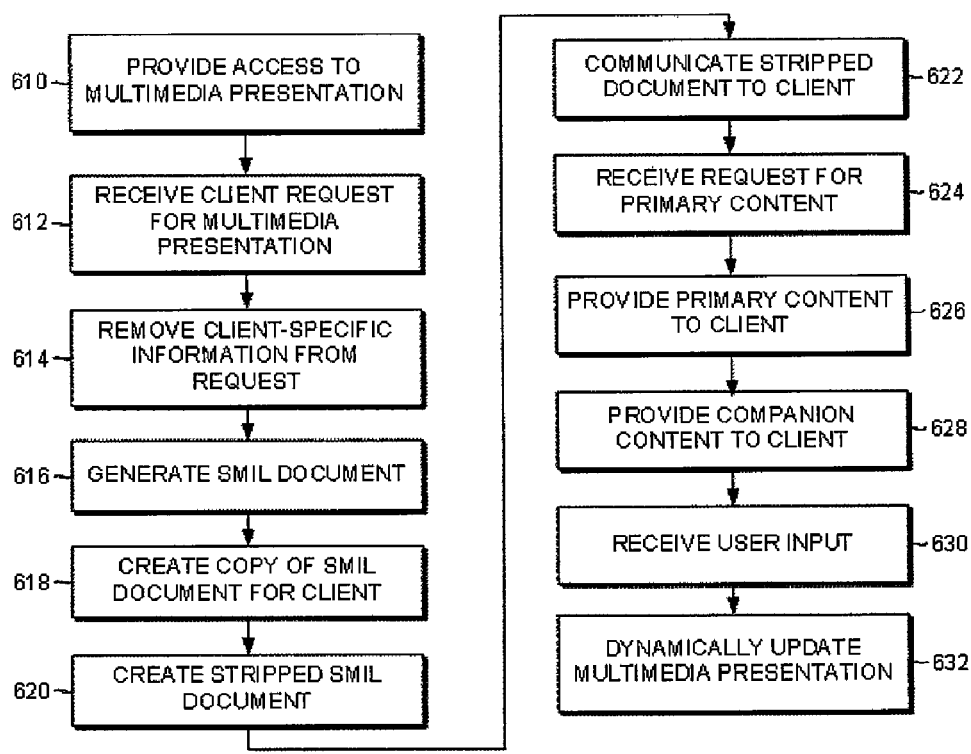
FIG. 6 is a flow diagram illustrating an exemplary method of providing a multimedia presentation to a client while maintaining user anonymity according to an embodiment of the present invention.

With reference to FIG. 6, one embodiment of a method for providing a dynamic multimedia presentation while maintaining client anonymity includes, at a step 610, providing access to a multimedia presentation. This access can be provided in any number of ways such as, for example, by providing a static link to the presentation on a web page, providing a dynamic option for selecting the multimedia presentation, providing the multimedia presentation in response to an automatic request for the presentation, and the like.

At a step 612, a request for the presentation is received from a client. In one embodiment, the request received at step 612 includes one or more instances of client-specific information. Client-specific information, as discussed above, includes information that could be used to identify the client, as well as any type of information that should be maintained in confidence. In an embodiment, as described above, the request is received at a RMSG as well as at a media server. In another embodiment, the request is received only at one or the other. In further embodiments of the invention, the request is received at some other network element useful in implementing such embodiments of the present invention.

At a step 614, client-specific information is removed from the request. In an embodiment, this step is performed at an RMSG. In other embodiments, this step is performed at an MRG or other server. In response to the request, at a step 616, the dynamic multimedia presentation is generated. In an embodiment such as the one illustrated in the flow diagram associated with IP, and the dynamic multimedia presentation may include a SMIL document. The SMIL document may be configured such that it can be distributed between more than one SMIL agent, or server. In other embodiments, the dynamic multimedia presentation comprises a multimedia document written according to a different specification. In an embodiment, the document includes one or more client-executable elements and one or more server-executable elements. That is, a distributed multimedia presentation document generally includes elements that only a client should execute, as well as other elements that only a server should execute.

At a step 618, a copy of the SMIL document is created for sending to the client. In this manner, each of the SMIL agents (e.g., the client, the SMIL) receives a copy of the SMIL document. At a step 620, a stripped document is created by removing server-executable elements from the client's copy of the SMIL document. In some embodiments, other elements are removed such that only client-executable elements remain. At a step 622, the stripped document is communicated to the client.

Upon execution of the SMIL document, at a step 624, a client-executable element may result in a user request for primary multimedia content to be communicated and subsequently received by a network element such as, for example, an RMSG. Primary multimedia content includes the multimedia content that forms the center, or focus, of the multimedia presentation. For example, the primary multimedia content may be a video, a data stream, or other multimedia content. In response to a first request for primary multimedia, as illustrated at step 626, a media server may provide the primary multimedia content to the client associated with the user.

The embodiment illustrated in FIG. 6 further includes, at a step 628, providing one or more instances of companion content in response to another user request communicated according to another client-executable element in the stripped document. Various instances of companion content can include one or more input regions associated therewith such that a user can interact with the companion content by providing input to the input regions. Companion content can originate from a media server such as the media server from which the primary multimedia content originates. In other embodiments, companion content originates from a different server or servers. In some embodiments, companion content originates from a server or servers located on a third party network or a content network, remote from the network containing the MRG and RMSG.

At a step 630, user input is received by way of an input region, and at a step 632, the instance of user input is reported to one or more servers. In an embodiment, the instance of user input is reported to an MRG. In another embodiment, the instance of user input is reported to the server from which the companion content originated.

At a final illustrative step 632, in response to the user input, the multimedia presentation is dynamically updated. In an embodiment, the presentation is dynamically updated by replacing one or more elements in the SMIL document such that the client is able to retrieve additional companion content by executing the replacement elements. The additional companion content can include any type of content such as, for example, advertisements, promotions, options, and the like. In one embodiment, the additional companion content includes content that is targeted to the user based on one or more attributes associated with the user. Such attributes may be identified by various types of user input, demographic polling, and the like. In an embodiment, various attributes are identified based on actions taken by the user while the multimedia presentation is being provided.

Figure 7:
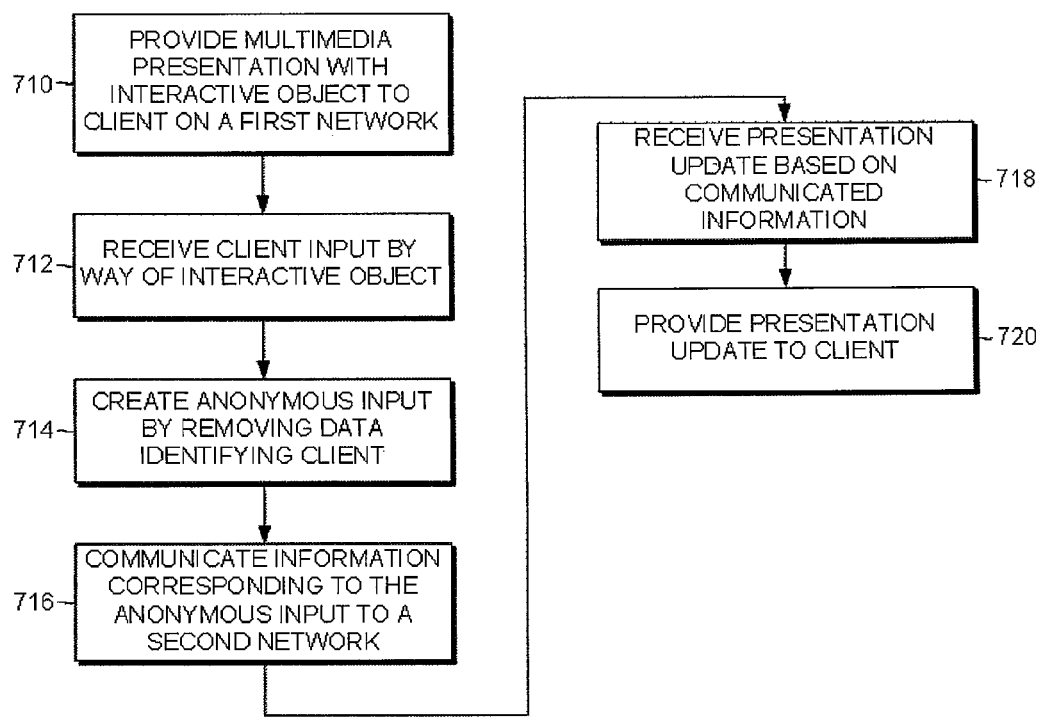
FIG. 7 is a flow diagram illustrating an exemplary method of providing a dynamic interactive multimedia presentation to a client while maintaining user anonymity according to an embodiment of the present invention.

With reference to FIG. 7, another embodiment of a method of providing a multimedia presentation in accordance with the present invention is provided that includes, at a step 710, providing a multimedia presentation to a client, wherein the multimedia presentation comprises one or more interactive objects capable of facilitating the communication of input from the client to a RMSG associated with a first network. In an embodiment, the multimedia presentation comprises a SMIL document that is distributed between several servers that execute various elements therein in a synchronized manner to provide a dynamic multimedia experience to a client. Additionally, in an embodiment, the interactive objects include links to companion content.

At a step 712, client input is received by way of the interactive object. At a step 714, data that identifies the client is removed from the client input to create an anonymous input, and information corresponding to the anonymous input is communicated, at a step 716, to a second network such as, for example, an advertising network. In an embodiment, the information is created by first reporting the anonymous input to an analytical component residing on a media referral gateway, wherein the analytical component tags the anonymous input with one or more analytics to create targeting information corresponding to the anonymous input. In various embodiments, analytics comprise observations regarding user trends corresponding to the anonymous input such that said targeting information facilitates the provision of companion content that is targeted to the user, wherein the targeted companion content comprises content determined to enrich the user's experience.

At a step 718, a presentation update based on the communicated information is received. In a final illustrative step, step 720, the presentation update is provided to the client. In this manner, the multimedia presentation can be dynamically updated while the client is executing the corresponding SMIL document.

Figure 8:
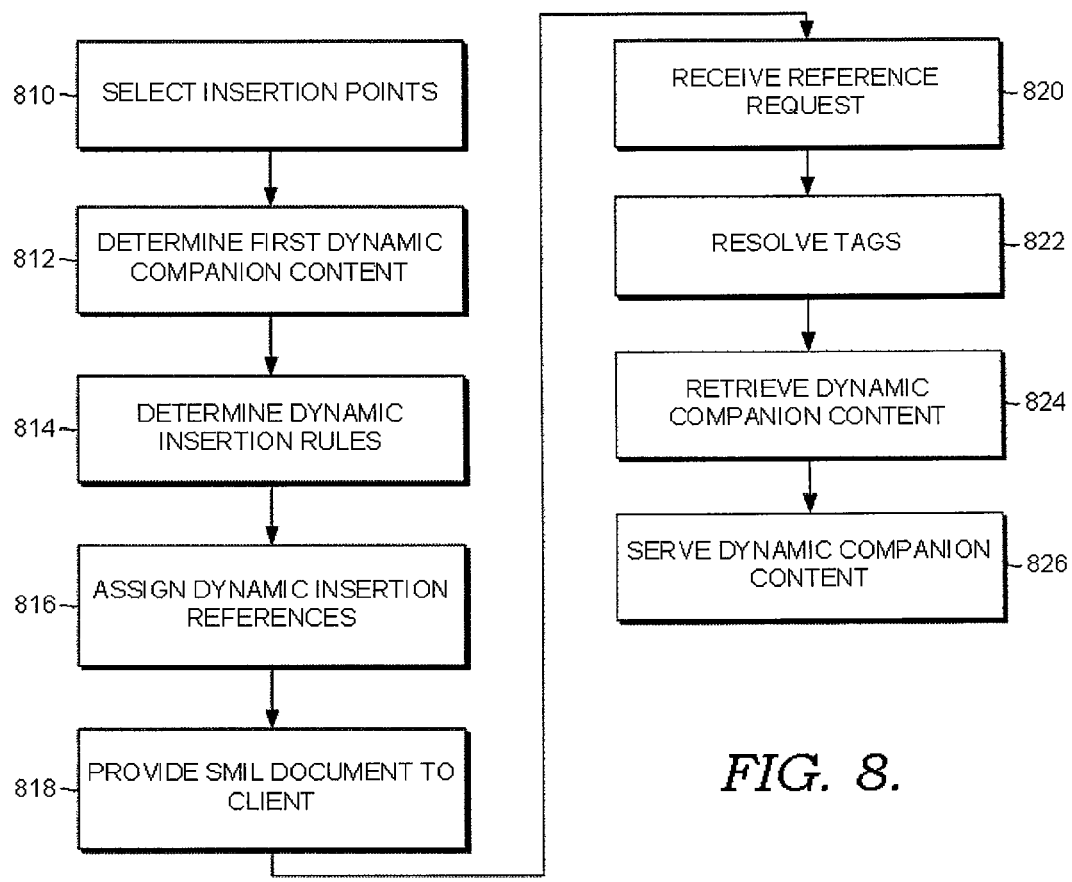
FIG. 8 is a flow diagram illustrating another exemplary method of providing a dynamic interactive multimedia presentation to a client while maintaining user anonymity according to an embodiment of the present invention.

With reference to FIG. 8, a third embodiment of the present invention is shown as an exemplary method of providing an interactive dynamic multimedia presentation. At a step 810, insertion points are selected. As discussed above, insertion points can be selected as time-based points within a SMIL document, or can be configured to cause insertion of companion content based on a particular event. At a step 812, a first instance of dynamic companion contact is determined, and one or more rules or conditions governing the insertion of the dynamic companion content are determined at a step 814. At step 816, the dynamic insertion references are defined within the SMIL document and the SMIL document is provided to a client, as shown in step 818.

As the SMIL document is executed on the client, a particular time or event occurs, triggering a request for resolution of a dynamic insertion reference, as shown at a step 820. At step 822, a server such as, for example, an MRG resolves any tags that may be associated with the reference request. In an embodiment, tags include analytics that facilitate targeted advertisement. In another embodiment, tags include parameters or instructions for the timing of playing the companion content, the position on a display screen reserved for the companion content, and the like. At step 824, the dynamic companion content satisfying the request is retrieved. The dynamic companion content may be retrieved from an outside entity such as, for example, an advertising server. In another embodiment, the dynamic companion content may be retrieved from within the network such as, for example, from a media server. In a final illustrative step, step 826, the dynamic companion content is served to the client.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. For example, in an embodiment, clients will vary in terms of capabilities supported and may provide information to an RMSG which permits the system to send appropriately formatted SMIL documents to the client. In another embodiment, some clients may support push technologies. When this is the case the RMSG may mask this capability from the MS and MRG. Relying on MS and client triggers and internal logic based upon the SMIL document, the RMSG may push data to the client.

Additionally, in various embodiments, a deterministic mechanism is required for the RMSG and MS to ensure that they arrive at the same MRG. In an embodiment, an example of such a mechanism is to perform a bucket hash on the client IP address where the number of buckets is equal to the number of MRG interfaces/servers available to the RMSGs and MSs.

In still a further embodiment, a presentation may already be in progress before the SMIL document is delivered to an agent (CDN element). In this case, the agent may be notified of the location where the agent is located or should be located in the document. In various embodiments, an agent should execute all elements up to and including beginning the media object. In these cases, use of the <syncBehavior>, <syncTolerance> and <syncMaster> elements may be required.

In other embodiments, carousels are provided by broadcast networks using a SMIL document. In one embodiment, carousel play is supported by moving from one element to the next element, which is supported through a current position attribute and an infinitely looping exc element. In another embodiment, carousels are played by language binding to store the timestamp in an agent as well as calculate the offset of the durations from a relative position.

In various embodiments of the present invention, the Basic Content Control Module allows for the ability to switch between alternate selections corresponding to the method of fetching primary content. For example, SystemTest elements may occur for bit rate, screen size, and the like, which the system may use in making decisions regarding the provision of content.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable storage media having computer-useable instructions embodied thereon, that when executed by one or more computing devices, performs a method of providing a dynamic multimedia presentation while maintaining client anonymity, the method comprising:
   a content delivery network, providing access to a multimedia presentation;
   a rich media service gateway, receiving a request from a client for said presentation, wherein the request comprises client-specific information and removing said client-specific information from the request;
   a media referral gateway, generating the dynamic multimedia presentation, wherein the dynamic multimedia presentation comprises a distributed Synchronized Multimedia Integration Language (SMIL) document having one or more client-executable elements and one or more server-executable elements; and
   the rich media service gateway, creating a copy of said SMIL document for sending to the client, creating a stripped document by removing the one or more server-executable elements from said copy such that only client-executable elements remain, and communicating the stripped document to the client.

2. The media of claim 1, further comprising providing primary multimedia content in response to a first user request communicated according to a first client-executable element in said stripped document, wherein said multimedia content is provided by a media server.

3. The media of claim 2, further comprising providing at least one first instance of companion content in response to a second user request communicated according to a second client-executable element in said stripped document, wherein said companion content comprises content other than the primary multimedia content.

4. The media of claim 3, wherein said companion content comprises an impression having an input region associated therewith such that a user can interact with the companion content by providing input to the input region.

5. The media of claim 4, wherein said companion content comprises content originating from a server different from the server that provides the primary multimedia content.

6. The media of claim 5, further comprising reporting an instance of user input received by way of the input region to the server from which the companion content originates.

7. The media of claim 4, further comprising dynamically updating the multimedia presentation in response to user input received by way of the input region.

8. The media of claim 7, wherein dynamically updating the multimedia presentation comprises replacing one or more elements in the SMIL document such that the client is able to retrieve at least one second instance of companion content.

9. The media of claim 8, wherein said at least one second instance of companion content comprises content that is targeted to the user based on one or more attributes associated with the user, wherein said attributes are identified based on actions taken by the user while the multimedia presentation is being provided.

10. A system for providing a synchronized multimedia presentation with interstitial targeted companion media by using a distributed dynamically updateable Synchronized Multimedia Integration Language (SMIL) document, the system comprising:
    a media service gateway having a processor coupled to a memory operable to anonymize a plurality of communications between a client and a content distribution network, wherein at least one of said communications comprises a first client request for a multimedia presentation and wherein the first client request is anonymized by removing client-specific information from the first client request to create an anonymized request;
    a media referral gateway having a processor coupled to a memory operable to create and distribute two or more copies of the dynamically updateable SMIL document having one or more client-executable elements and one or more server-executable elements in response to the anonymized request received from the media service gateway, wherein at least one of said copies of the SMIL document is provided to the client and another at least one of said copies of the SMIL document is a stripped document provided to the client, wherein the stripped document is created by removing the one or more server-executable elements from said copy such that only client-executable elements remain; and
    a media content server having a processor coupled to a memory operable to provide multimedia content to the client in response to a second client request for content, wherein the second client request is communicated to the media content server as a result of execution of the at least one copy of the SMIL document at the client.

11. The system of claim 10, wherein the media service gateway comprises a reporting component for tracking instances of user input associated with the multimedia presentation.

12. The system of claim 11, wherein the reporting component is configured to communicate information corresponding to instances of user input to one or more entities remote from the media services gateway.

13. The system of claim 10, wherein the media referral gateway comprises an insertion component for inserting companion content into the dynamic multimedia presentation.

14. One or more non-transitory computer-readable storage media having computer-useable instructions embodied thereon, that when executed by one or more computing devices, performs a method of providing a dynamic multimedia presentation while maintaining client anonymity, the method comprising:
    providing a multimedia presentation to a client, wherein the multimedia presentation comprises a distributed Synchronized Multimedia Integration Language (SMIL) document having one or more client-executable elements and one or more server-executable elements capable of facilitating the communication of input from the client to at least one media service gateway associated with a first network;
    creating a copy of said SMIL document for sending to the client;
    creating a stripped document by removing the one or more server-executable elements from said copy such that only client-executable elements remain;
    communicating the stripped document to the client;
    receiving client input by way of the SMIL document;
    removing data that identifies the client from the client input to create an anonymous input;
    communicating targeting information corresponding to the anonymous input to a second network;
    receiving a presentation update based on the communicated information; and providing the presentation update to the client, such that the multimedia presentation is dynamically updated during execution at the client.

15. The media of 14, wherein the SMIL document is distributed between one or more servers.

16. The media of claim 15, wherein the one or more servers each execute at least one element included within the SMIL document in a synchronized manner to provide a dynamic multimedia experience to a client.

17. The media of claim 14, wherein the the SMIL document includes a link to an instance of companion content.

18. The media of claim 14, further comprising reporting the anonymous input to an analytical component residing on a media referral gateway, wherein the analytical component tags the anonymous input with one or more analytics to create targeting information corresponding to the anonymous input.

19. The media of claim 18, wherein said one or more analytics comprise observations regarding at user trends corresponding to the anonymous input such that said targeting information facilitates the provision of companion content that is targeted to the user, wherein the targeted companion content comprises content determined to enrich the user's experience.

20. The media of claim 14, wherein the second network comprises one or more advertisement servers.

* * * * *